(12) United States Patent
Large

(10) Patent No.: US 7,671,838 B2
(45) Date of Patent: Mar. 2, 2010

(54) BIOMECHANICALLY LOW LOAD MULTI-ANGLE MULTI-DEXTERITY COMPUTER MOUSE

(76) Inventor: William Thomas Large, 140 Old Country Rd., Mineola, NY (US) 11501

(*) Notice: Subject to any disclaimer, the term of this patent is extended or adjusted under 35 U.S.C. 154(b) by 749 days.

(21) Appl. No.: 11/536,107

(22) Filed: Sep. 28, 2006

(65) Prior Publication Data

US 2008/0079694 A1  Apr. 3, 2008

(51) Int. Cl.
*G09G 5/00* (2006.01)
(52) U.S. Cl. .................. 345/156; 345/163; 345/164; 345/165; 345/166
(58) Field of Classification Search .............. 345/156, 345/163–166
See application file for complete search history.

(56) References Cited

U.S. PATENT DOCUMENTS

| | | | |
|---|---|---|---|
| 6,072,471 A * | 6/2000 | Lo | 345/163 |
| 6,373,468 B1 * | 4/2002 | Leman | 345/163 |
| 6,750,845 B2 | 6/2004 | Hopper | |
| 7,006,074 B2 * | 2/2006 | Chesters | 345/156 |
| 2004/0246231 A1 | 12/2004 | Large | |

* cited by examiner

*Primary Examiner*—Richard Hjerpe
*Assistant Examiner*—Leonid Shapiro
(74) *Attorney, Agent, or Firm*—Jennifer Meredith, Esq.; Meredith & Keyhani, PLLC

(57) ABSTRACT

A multi-angle, multi-dexterity mouse apparatus comprising: a base, configured to be placed on a working surface and having: a bottom surface configured to be placed on a working surface; a first inner surface; a second inner surface, the second inner surface being the mirror image of and opposed to the first inner surface, wherein the first inner surface and the second inner surface are in adjustable communication to receive a portion of the mouse users hand; a first housing in rotatable adjustable communication with the base, wherein the first housing has an inner surface with an actuation means and an outer surface.

39 Claims, 10 Drawing Sheets

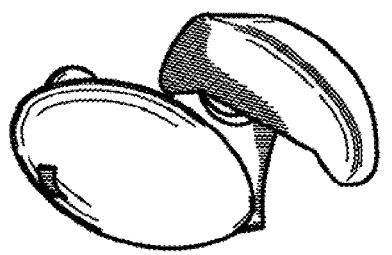
FIG. 8D
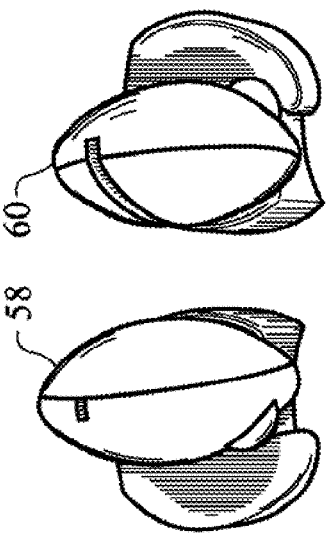
FIG. 8H
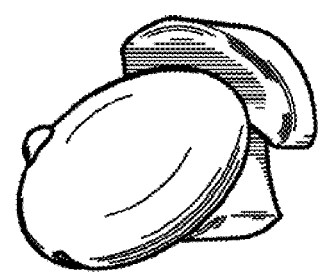
FIG. 8C
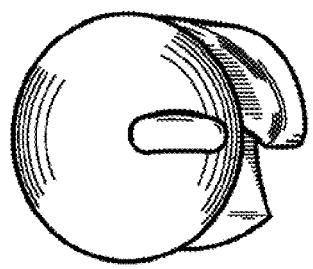
FIG. 8G
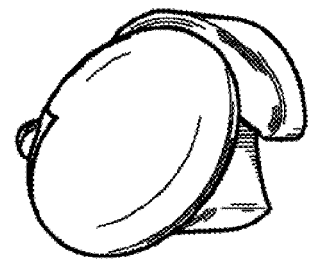
FIG. 8B
FIG. 8F
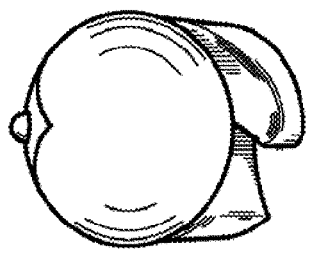
FIG. 8A
FIG. 8E

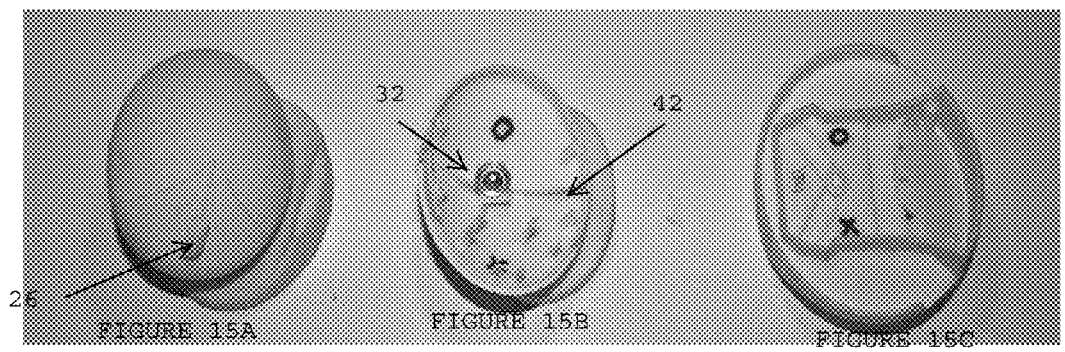
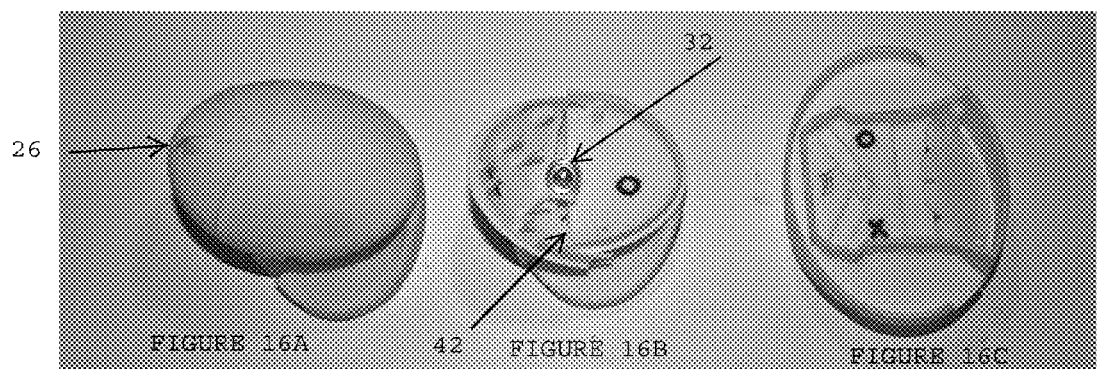
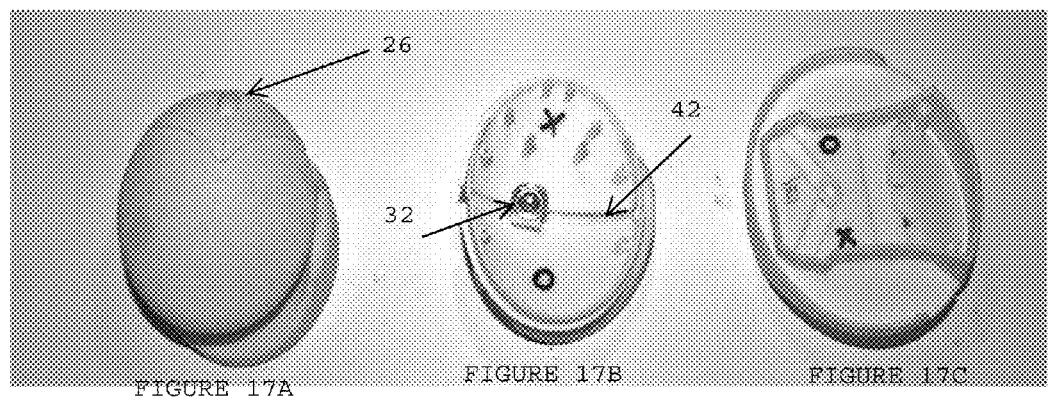

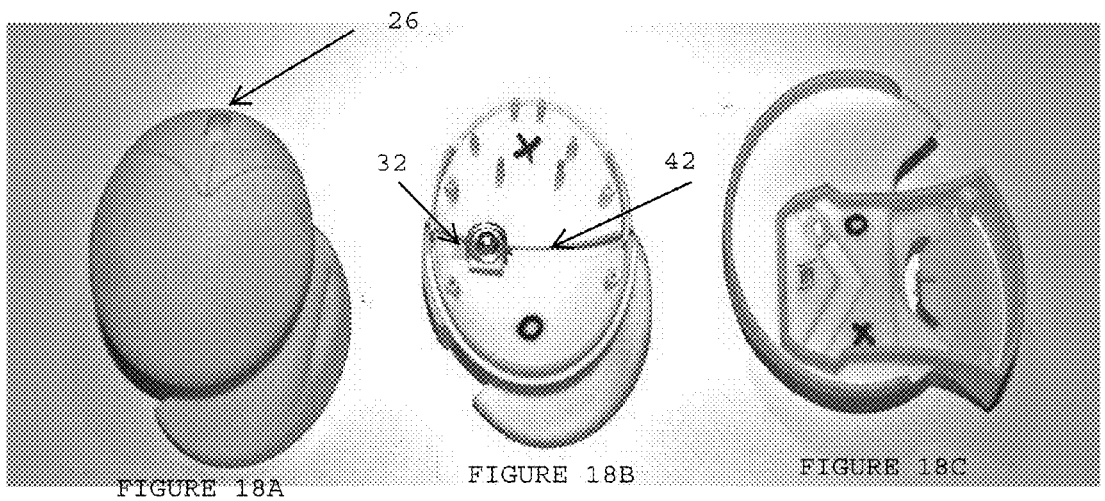
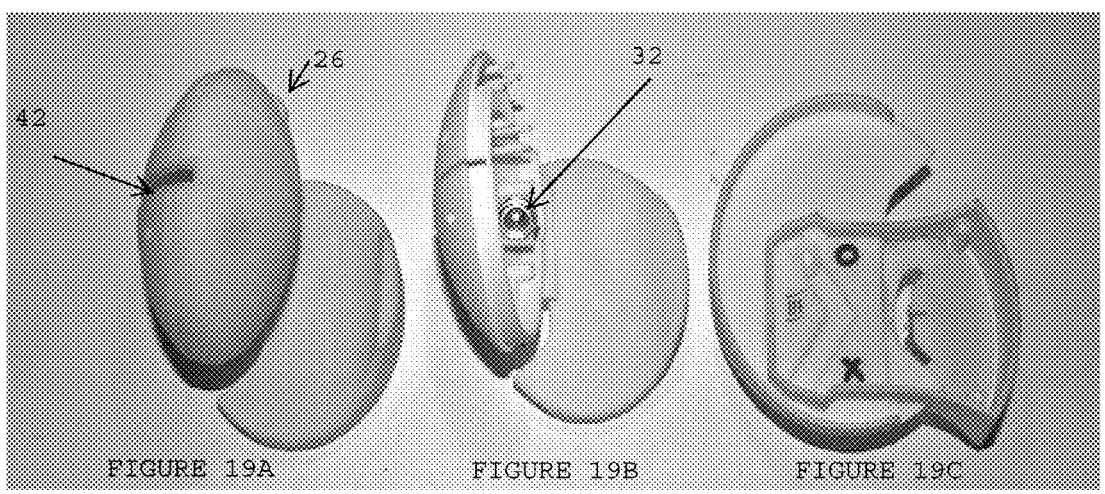
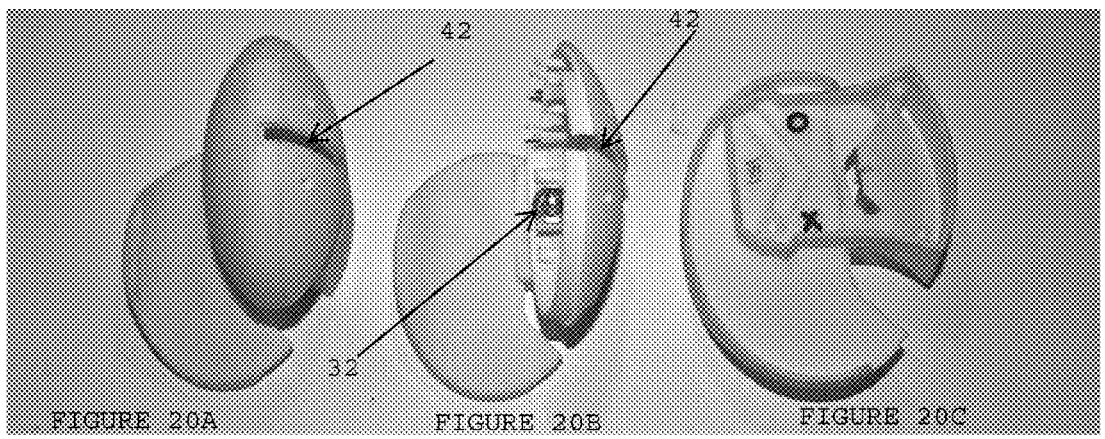

BIOMECHANICALLY LOW LOAD MULTI-ANGLE MULTI-DEXTERITY COMPUTER MOUSE

PRIORITY CLAIM

This application claims priority to co-pending patent application Ser. No. 10/453,773 entitled, "Biomechanically Low Load Computer Mouse" filed Jun. 3, 2003.

BACKGROUND OF THE INVENTION

The present invention generally relates to computer input devices, namely those which require the interaction between user, arm, and hand including mice, joysticks, and pens. The disclosed invention attempts to reestablish the true meaning of an ergonomic device as that which induces a low biomechanical load on the user. Specifically, biomechanically low load is in reference to the human arm, hand in coordination with the current invention.

Conditions of low load, regarding physical human movement, can be derived of two components: the physical structure and "grip" required of the arm and hand by the device, as well as the motion of the hand and arm system required described in both magnitude and form. Low load, with regards to the "grip" of the hand is known within the art as deviance from the rest position of the arm and hand. The rest position is known to be the structure of the arm and hand in a standing position, not tensed and unaffected. The rest position of the hand can be described, generally, as a handshake position, with thumbs and fingers facing downward, fingers curled pointing towards the body. This structure establishes the ideal ergonomic structure. However, prior art mice generally do not provide for mousing with the hand in an at rest position. Furthermore, the extent of physical deviation from this position may be known as strain.

As far as the motion of the hand and arm, several factors are derivative. First, it is known within the art that although some movement is necessary and beneficial over a period of time of usage, ideally, stress should be avoided throughout the fine motor control muscles of the lower hand, and preferably applied to the larger muscles of the upper arm.

It is with respect to these parameters that the current invention can be compared understandably over prior art. For instance, in U.S. Pat. No. 5,355,147 issued to Lear, a device of vertical orientation is taught. However, all fingers of the hand are required to grip the mouse. In addition, the wrist support inflects the hand in an upward motion. This invention induces strain on the user in both manners. The necessity to clench and support the mouse with all fingers, as well as the wrist support in an altering position, leads to a clear deviation from the ideal position previously described.

Additionally, U.S. Pat. No. 5,576,733 issued to Lo discloses an invention, which improves upon that of Lear by securely gripping the device, vertically, by consisting of a housing structure with two simple sides. One side allows for placement of the thumb as the other side allows for placement of the fingers. Control is improved by giving the user the ability to move the pointer by flexing either the thumb or fingers more so than the entire arm or wrist. Thus, the ideal arm and hand motion, as described earlier, is violated at the expense of better control.

Also known within the art are hand controller devices, such as U.S. Pat. No. 4,862,165 issued to Gart, which attempts to provide an "ergonomic" device. The '165 patent fails to provide support for the vertical orientation of the hand of the user. Thus, once again, the ideal low load position is violated.

Also known within the art, are devices known as trackballs and combinations of trackballs and mice. U.S. Pat. No. 6,292,175 issued to Sheehan discloses such a device. In this patent, Sheehan teaches a mouse similar to that Gart with respect to hand orientation. However, a trackball is provided to negate the necessity for large arm and wrist movements. This, however, gives rise to repetitive, lengthy use of the weak muscles of the thumb and fingers and creates torque within the lower arm due to the lack of a vertical orientation.

Another problem with prior art mousing devices is the requirement to purchase separate mousing devices for left and right handed individuals. This can be expensive for houses in which there are both left and right handed users of a single computer. Also, for public spaces (such as public libraries) it is desirable to provide a biomechanically low load computer mouse that can be used by all users.

As can be seen, there is a need within the art for a hand controlled pointing device, which truly performs at a low load level, significantly reducing high statistics rates of damaged muscle tissue and severe injury. Also, a mouse that can be adjusted between left and right handed devices. There is also a need for a hand pointing device which can adjust to the varying hand structure of different users. Additionally, there is a need for a device which may apply contour in effective areas, and support the hand in such a way that strain is concentrated on the larger muscles of the lower arm rather than specific muscles of the wrist and fingers.

SUMMARY OF THE INVENTION

The present invention provides a biomechanically low load mouse and methods for providing an adjustable grip-less and biomechanically low load mouse. Such apparatus and methods are useful for general comfort, individuals with arthritis, and preventing carpal tunnel syndrome and other repetitive disorders in both left and right handed users.

According to one embodiment of the present invention, a multi-angle, multi-dexterity mouse apparatus is disclosed, the apparatus comprising:

a base, configured to be placed on a working surface the base having: a bottom surface configured to be placed on a working surface; a first inner surface; a second inner surface, the second inner surface being the mirror image of and opposed to the first inner surface, wherein the first inner surface and the second inner surface are in adjustable communication to receive a portion of the mouse users hand; a first housing in rotatable adjustable communication with the base, wherein the first housing has an inner mousing surface with an actuation means and an outer mousing surface.

A multi-angle, multi-dexterity mouse apparatus, the apparatus comprising: a first side having a first inner surface, a first outer surface and a first base; a second side having a second inner surface, a second outer surface and a second base, the second inner surface being opposed to the first inner surface, wherein the first inner surface and the second inner surface are in adjustable communication to receive a portion of the mouse users hand and the first base and the second base are configured to be placed on a working surface for mousing; a first housing in rotatable adjustable communication with the base, the first housing having a inner mousing surface with an actuation means and an outer mousing surface having an elongated opening substantially opposed to and perpendicular to the actuation means; a connector means, wherein the connector means connects the first housing to the base and is contained within the elongated opening to allow the first housing to rotate between a left handed and right handed mouse along the elongated opening.

BRIEF DESCRIPTION OF THE DRAWINGS

FIGS. 8A-20C depicts the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The conventional palm-down position of many mousing devices is cited by many ergonomist's as placing the protonator muscles in forearm, required to twist the wrist, under constant tension. Muscle tension leads to muscle fatigue that is associated with the development of overuse syndromes due to working in a static posture. While the theoretical upright, or handshake posture removes this particular static posture, products made to that design are inflexible and require the purchaser to make a decision as to pal down or upright at the time of purchase. The possibility to alter the angle of the mouse button surface would mean that a gradual progression to the less fatiguing upright position could be achieved making the process of working in an upright posture more easily and so effectively assimilated. The present invention provides a multiple angle positioning of the mouse button surface and also allows for human variability in which the usual handshake orientation is no the normal resting position of some individuals.

Additionally, upright mice in particular, require for left and right hand versions to be made available. The present invention provides a mouse which can be used in the upright position, or at angles between vertical and horizontal (in relation to the inner mousing surface) and can be easily converted to either left of right handed applications.

Figure 1:
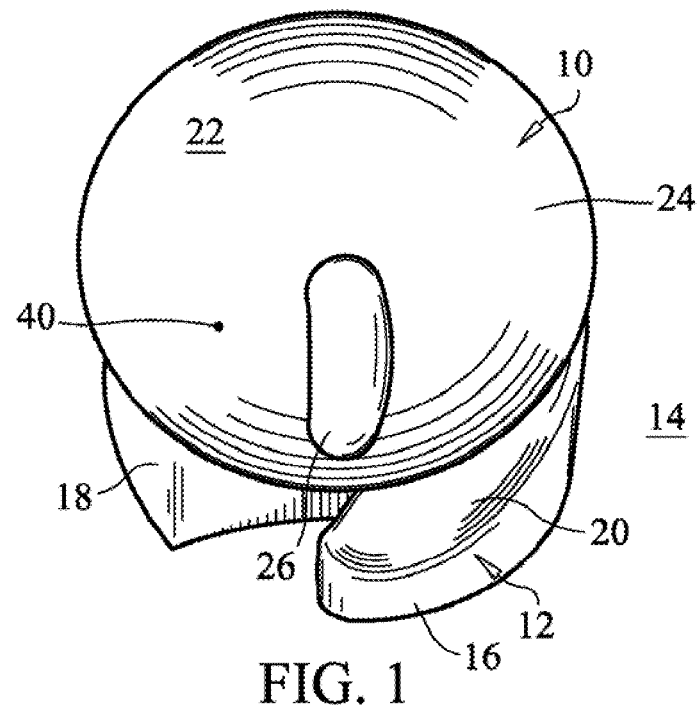
FIG. 1 depicts the present invention.
Figure 2:
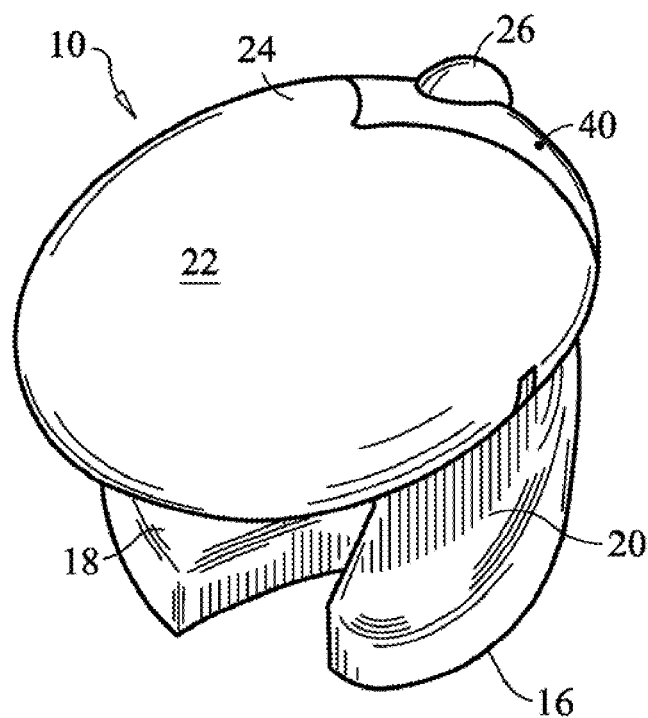
FIG. 2 depict the present invention.
Figure 3:
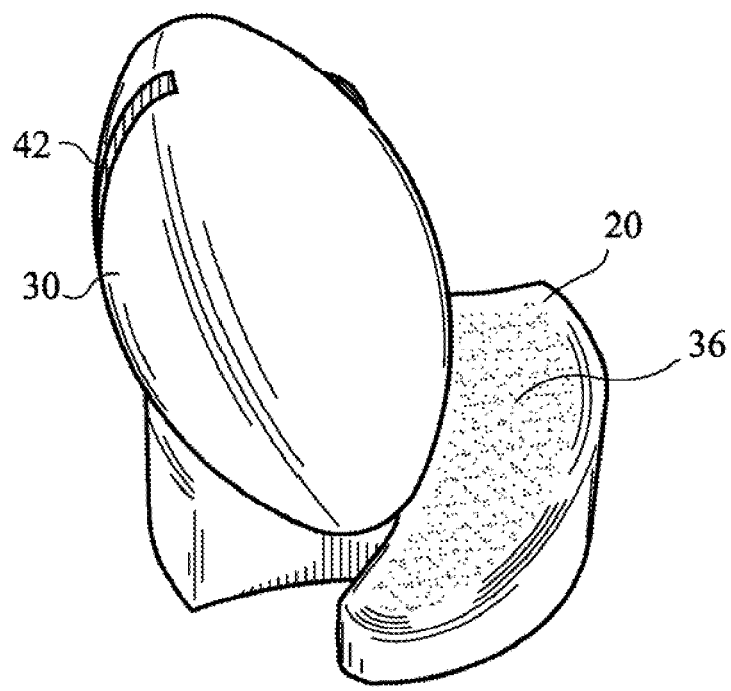
FIG. 3 depicts the present invention.
Figure 4:
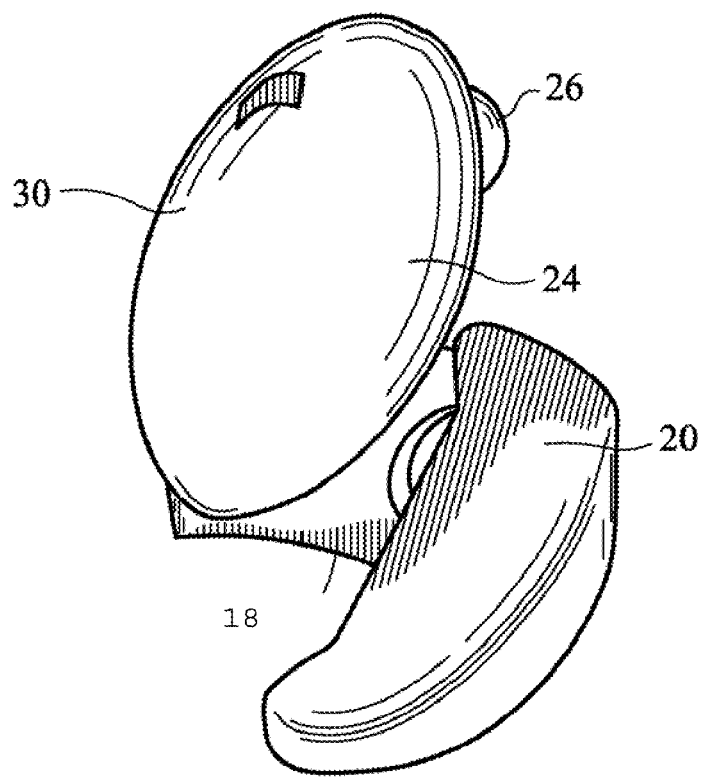
FIG. 4 depicts the present invention.
Figure 5:
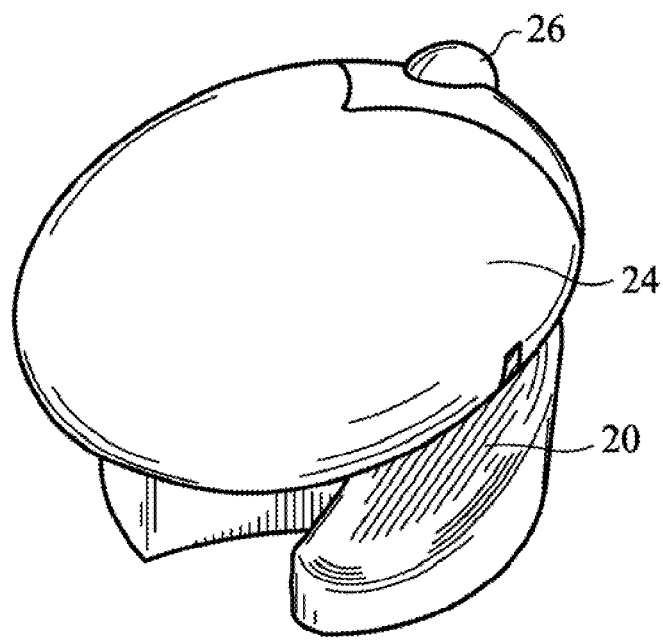
FIG. 5 depicts the present invention.
Figure 6:
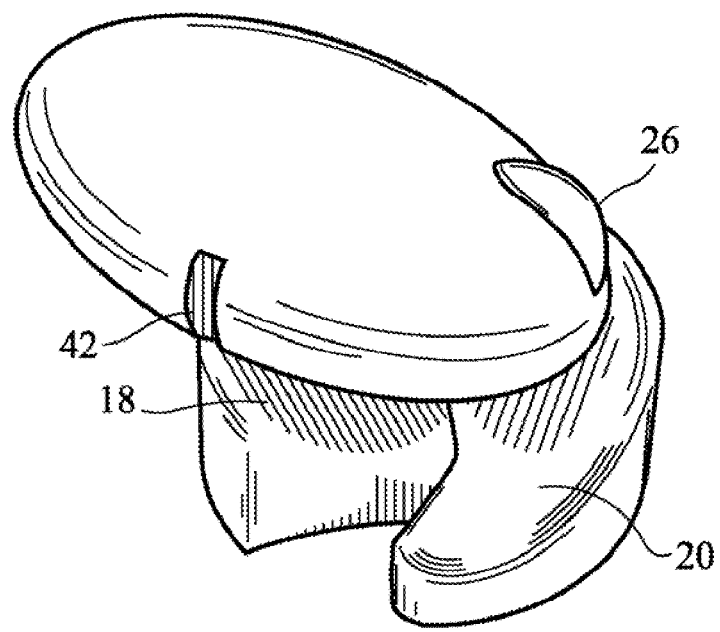
FIG. 6 depicts the present invention.
Figure 7:
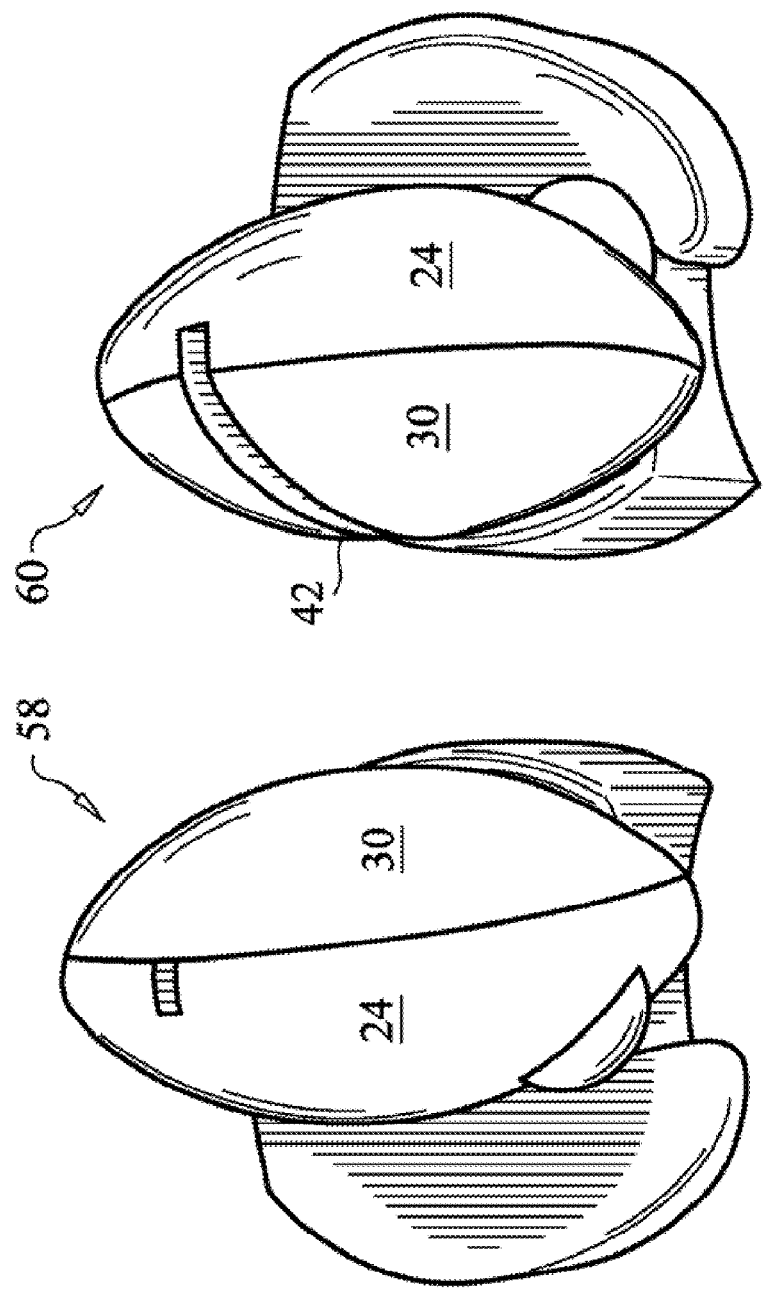
FIG. 7 depicts the present invention.
Figure 9:
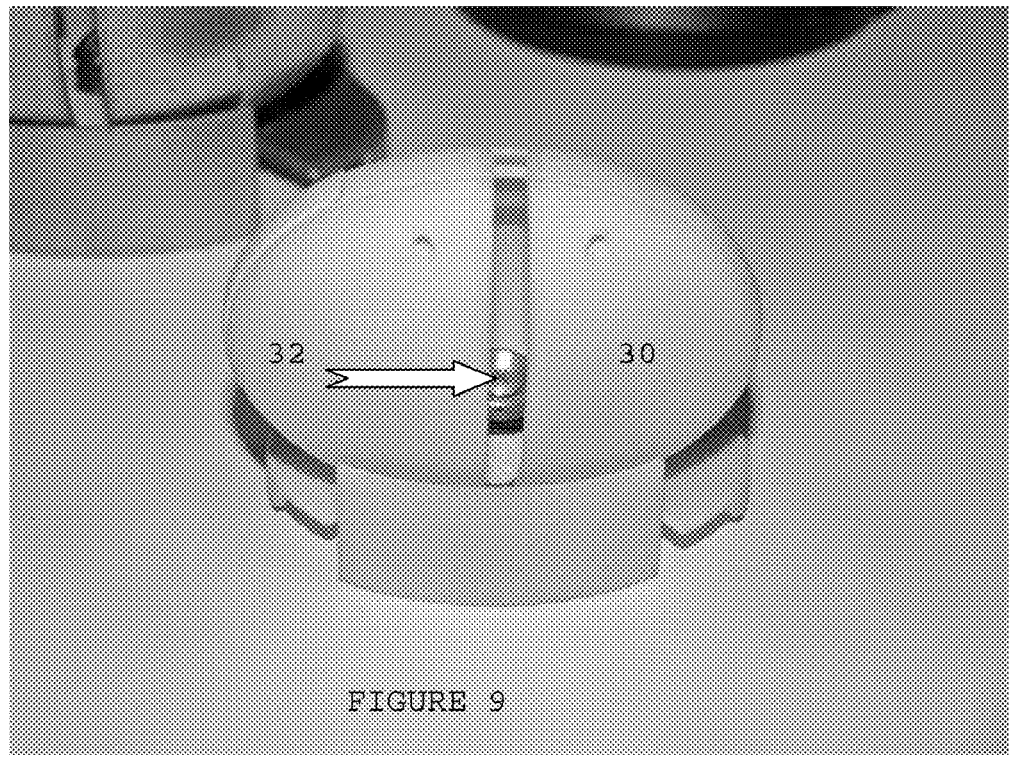
Figure 10:
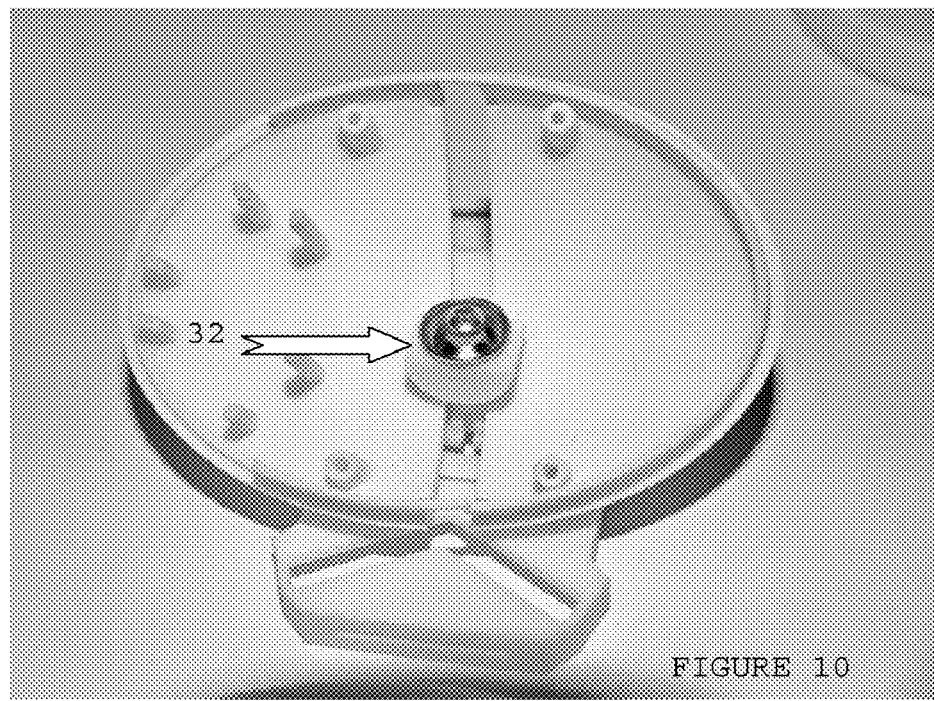
Figure 11:
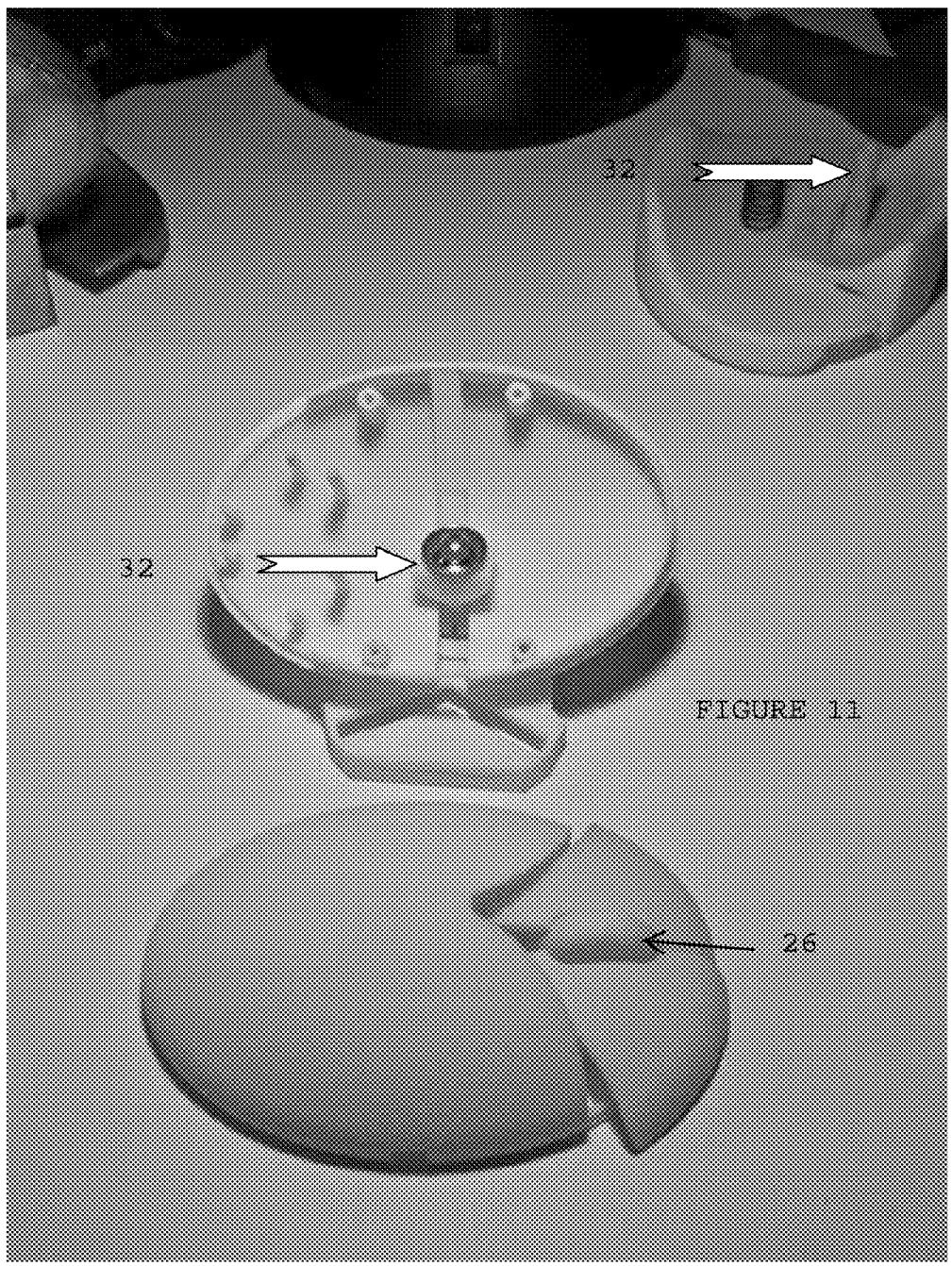
Figures 12A, 12B, 12C:
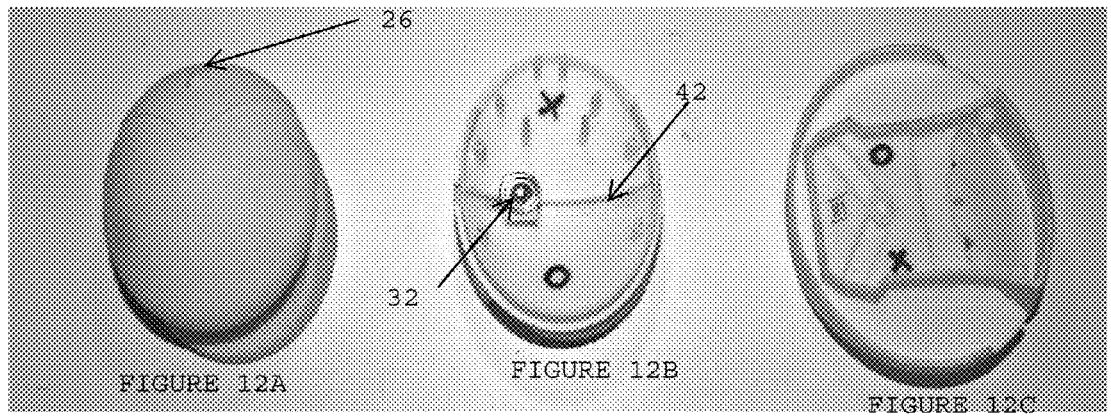
Figures 13A, 13B, 13C:
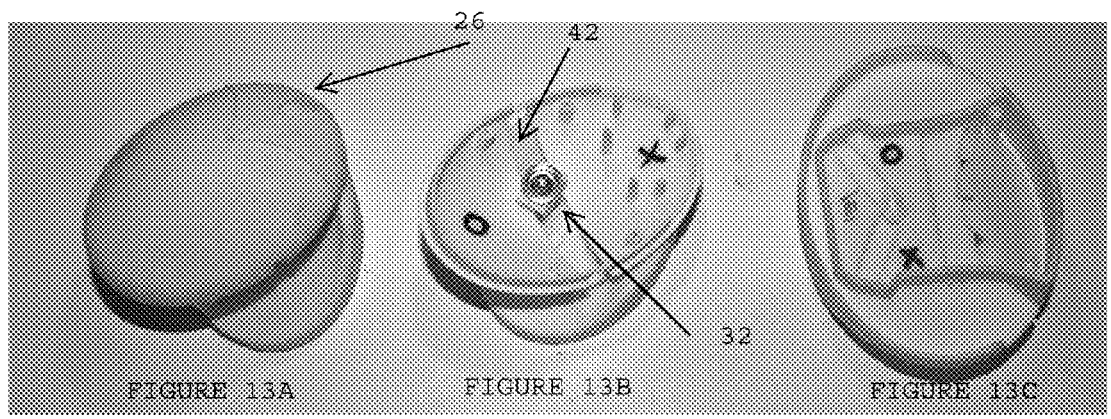
Figures 14A, 14B, 14C:
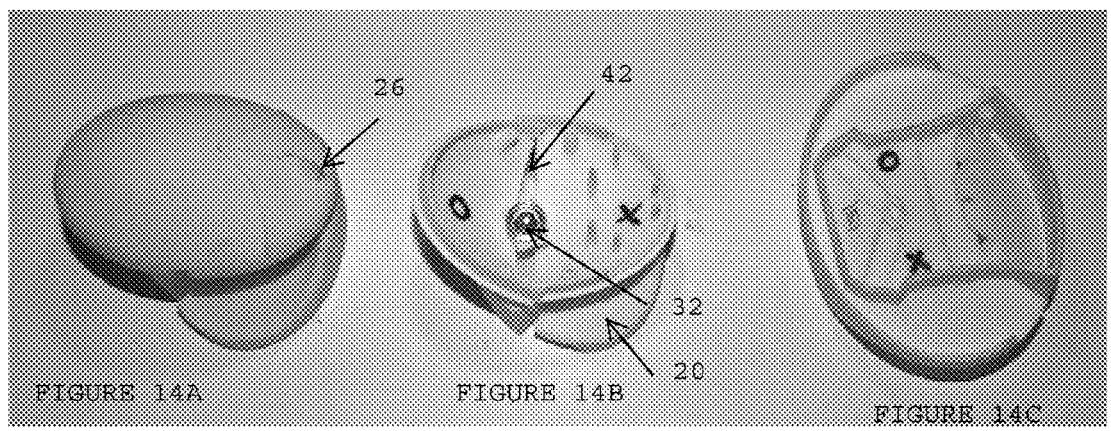

Turning to FIGS. 1-20C the present invention provides a multi-angle, multi-dexterity mouse apparatus (10) according to the present invention. The apparatus (10) comprising: a base (12) configured to be placed on a working surface (14) the base (12) having: a bottom surface (16) configured to be placed on a working surface (14); a first inner surface (18); a second inner surface (20), the second inner surface (20) being the mirror image of and opposed to the first inner surface (18), wherein the first inner surface (18) and the second inner surface (20) are in adjustable communication to receive a portion of the mouse users hand; a first housing (22) in rotatable adjustable communication with the base (12), wherein the first housing (22) has an inner mousing surface (24) with an actuation means (26) and an outer mousing surface (30). The actuation means (26) as shown is a actuation wheel. However, this may be any actuation means known within the art including buttons, sensors, trackballs.

The second inner surface (20) may be adjustable in a substantially horizontal direction. The first inner surface (18) is manually adjustable by the user in a substantially parallel direction relative to the second inner surface (20). The second inner surface (20) may be manually adjustable by the user in a substantially parallel direction relative to the first inner surface (18). The second inner surface (20) and the first inner surface (18) may be manually adjustable by the user in an expandable upside V shape. There may be a connector device (32) for connecting the first inner surface (18) to the second inner surface (20). The connector device (32) may be selected from the group consisting of interlocking arches, a hinge, adjustable screw, screw, frictional positioner, pins, and hinge and pin set. The second inner surface (20) may be automatically adjustable in a substantially vertical direction by an electromechanical actuator within the mouse device. There may also be a hand-cushioning supportive material (36) in fixed contact with at least one of base (12), first inner surface, second inner surface (20) and first housing (22). The hand-cushioning supportive material (36) may be chosen from the group consisting of foam and gel. The first inner surface (18) may have a plurality of continuous curved regions extending the length of the first inner surface (18) for receipt of a portion of the users hand. The plurality of continuous curved regions may extend the length of the first inner surface (18) for receipt of a portion of the users hand. The first housing (22) may take many shapes, including being an oval, ellipse, egg, paraboloid, ellipsoid and circular. There may also be at least one sensor (40) that, in response to a trigger, activates or deactivates a mousing action. The sensor (40) may sense the presence of a users hand and allow for mousing when the users hand is present. The sensor (40) may be used to scroll the screen cursor in response to hand movement.

As depicted in FIGS. 9-20C, to allow for the first housing to rotate and move according to the users hand, dexterirty and comfort, the first housing (22) may have an elongated opening (42) along the outer surface substantially opposed to and perpendicular to the actuation means (26); a connector device, wherein the connector device (32) is a hinge and pin type connector device and connects the first housing to the base and is contained within the elongated opening (42) to allow the first housing to rotate between a left handed and right handed mouse along said elongated opening, as shown in FIGS. 7 and 9-20C. The elongated opening (42) may be a rectangular shape. The elongated opening (42) may run perpendicular to the direction of the hand when mousing and in the middle of the outer mousing surface (30).

FIG. 8 depicts manner in which the present invention may rotate to accommodate different hand positions, angles and left handed and right handed positions. FIG. 8A depicts the standard palm down or starting position with the inner mousing surface (24) up. FIG. 8B depicts the mouse rotating upright clockwise (when looking at the mouse from the front with the base on the working surface) to allow for angled mousing. FIG. 8C depicts the mouse in a more vertical position. FIG. 8D depicts the mouse in an upright position. FIGS. 8E-8H depict how the mouse may be transformed from to a left handed mouse. First the mouse is rotated by turning the mouse with the inner mousing surface (24) flat clockwise, the provide the actuation means between the first inner surface (18) and second inner surface (20). Next the mouse may be rotated upright clockwise to provide the left handed mouse (60) depicted in FIG. 8H.

I claim:
1. A multi-angle, multi-dexterity mouse apparatus, said apparatus comprising:
    a base, configured to be placed on a working surface said base having:
        a bottom surface configured to be placed on a working surface;

a first inner surface;
a second inner surface, said second inner surface being the mirror image of and opposed to said first inner surface, wherein said first inner surface and said second inner surface are in adjustable communication to receive a portion of said mouse users hand;
a first housing in communication with said base, wherein said first housing has an inner mousing surface with an actuation means and an outer mousing surface, wherein said first housing is connected to said base and rotates relative to said base along a connector contained within an elongated opening.

2. An apparatus as in claim 1, wherein said second inner surface is adjustable in a substantially horizontal direction.

3. An apparatus as in claim 1, wherein said first inner surface is manually adjustable by the user in a substantially parallel direction relative to said second inner surface.

4. An apparatus as in claim 1, wherein said second inner surface is manually adjustable by the user in a substantially parallel direction relative to said first inner surface.

5. An apparatus as in claim 1, wherein said second inner surface and said first inner surface are manually adjustable by the user in an expandable upside V shape.

6. An apparatus as in claim 1, further comprising a connector device for connecting said first inner surface to said second inner surface.

7. An apparatus as in claim 6, wherein said connector device is selected from the group consisting of interlocking arches, a hinge, adjustable screw, screw, frictional positioner, pins, and hinge and pin set.

8. An apparatus as in claim 1, wherein said second housing is automatically adjustable in a substantially vertical direction by an electromechanical actuator within the mouse device.

9. An apparatus as in claim 1, further comprising a hand-cushioning supportive material in fixed contact with at least one of said base, said first inner surface, said second inner surface and said first housing.

10. An apparatus as in claim 9, wherein said hand-cushioning supportive material is chosen from the group consisting of foam and gel.

11. An apparatus as in claim 1, wherein said first inner surface comprises a plurality of continuous curved regions extending the length of said first inner surface for receipt of a portion of the users hand.

12. An apparatus as in claim 1, wherein said first inner surface comprises a plurality of continuous curved regions extending the length of said first inner surface for receipt of a portion of the users hand.

13. An apparatus as in claim 1, wherein said first housing is a curved shape.

14. An apparatus as in claim 13, wherein said curved shape is selected from the group consisting of an oval, ellipse, egg, parabaloid, ellipsoid and circular.

15. An apparatus as in claim 1, further comprising at least one sensor that, in response to a trigger, activates or deactivates a mousing action.

16. An apparatus as in claim 1, further comprising a sensor that can sense the presence of a users hand and allow for mousing when the users hand is present.

17. An apparatus as in claim 1, further comprising a sensor wherein said sensor may be used to scroll the screen cursor in response to hand movement.

18. An apparatus as in claim 1, said first housing further comprising:
An elongated opening along the outer surface substantially opposed to and perpendicular to said actuation means;
a connector means, wherein said connector means connects said first housing to said base and is contained within said elongated opening to allow said first housing to rotate between a left handed and right handed mouse along said elongated opening.

19. An apparatus as in claim 1, wherein said elongated opening is a rectangular shape.

20. An apparatus as in claim 1, wherein said actuation means is selected from the group consisting of a trackball, mouse, sensor.

21. A multi-angle, multi-dexterity mouse apparatus, said apparatus comprising:
a first side having a first inner surface, a first outer surface and a first base;
a second side having a second inner surface, a second outer surface and a second base, said second inner surface being opposed to said first inner surface, wherein said first inner surface and said second inner surface are in adjustable communication to receive a portion of said mouse users hand and said first base and said second base are configured to be placed on a working surface for mousing;
a first housing in communication with said base, said first housing having a inner mousing surface with an actuation means and an outer mousing surface having an elongated opening substantially opposed to and perpendicular to said actuation means and said first housing is connected to said base and rotates relative to said base along a connector contained within an elongated opening;
wherein said connector connects said first housing to said base and is contained within said elongated opening to allow said first housing to rotate between a left handed and right handed mouse along said elongated opening.

22. An apparatus as in claim 21, wherein said second housing is adjustable in a substantially horizontal direction.

23. An apparatus as in claim 21, wherein said first inner surface is manually adjustable by the user in a substantially parallel direction relative to said second inner surface.

24. An apparatus as in claim 21, wherein said second inner surface is manually adjustable by the user in a substantially parallel direction relative to said first inner surface.

25. An apparatus as in claim 21, wherein said second inner surface and said first inner surface are manually adjustable by the user in an expandable upside V shape.

26. An apparatus as in claim 21, further comprising a connector device for connecting said first inner surface to said second inner surface.

27. An apparatus as in claim 26, wherein said connector device is selected from the group consisting of interlocking arches, a hinge, adjustable screw, screw, frictional positioner, pins, and hinge and pin set.

28. An apparatus as in claim 21, wherein said second housing is automatically adjustable in a substantially vertical direction by an electromechanical actuator within the mouse device.

29. An apparatus as in claim 21, further comprising a hand-cushioning supportive material in fixed contact with at least one of said base, said first inner surface, said second inner surface and said first housing.

30. An apparatus as in claim 21, wherein said hand-cushioning supportive material is chosen from the group consisting of foam and gel.

31. An apparatus as in claim 21, wherein said first inner surface comprises a plurality of continuous curved regions extending the length of said first inner surface for receipt of a portion of the users hand.

32. An apparatus as in claim 21, wherein said first inner surface comprises a plurality of continuous curved regions extending the length of said first inner surface for receipt of a portion of the users hand.

33. An apparatus as in claim 21, wherein said first housing is a curved shape.

34. An apparatus as in claim 33, wherein said curved shape is selected from the group consisting of an oval, ellipse, egg, parabaloid, ellipsoid and circular.

35. An apparatus as in claim 21, further comprising at least one sensor that, in response to a trigger, activates or deactivates a mousing action.

36. An apparatus as in claim 21, further comprising a sensor that can sense the presence of a users hand and allow for mousing when the users hand is present.

37. An apparatus as in claim 21, further comprising a sensor wherein said sensor may be used to scroll the screen cursor in response to hand movement.

38. An apparatus as in claim 21, wherein said elongated opening is rectangular in shape.

39. An apparatus as in claim 21, wherein said actuation means is selected from the group consisting of a trackball, mouse, sensor.

* * * * *